(12) United States Patent
Eberle et al.

(10) Patent No.: US 6,488,140 B2
(45) Date of Patent: Dec. 3, 2002

(54) CONVEYOR TRANSPORT

(75) Inventors: Marc Eberle, Balgonie (CA); Jon Close, Regina (CA)

(73) Assignee: Brandt Industries Ltd., Regina (CA)

( * ) Notice: Subject to any disclaimer, the term of this patent is extended or adjusted under 35 U.S.C. 154(b) by 3 days.

(21) Appl. No.: 09/879,465

(22) Filed: Jun. 12, 2001

(65) Prior Publication Data

US 2002/0070098 A1 Jun. 13, 2002

(30) Foreign Application Priority Data

Dec. 12, 2000 (CA) .................................... 2327996

(51) Int. Cl.[7] ................................................ B65G 21/10
(52) U.S. Cl. ........................................ 198/314; 198/632
(58) Field of Search ................................ 198/300, 302, 198/312, 313, 314, 632

(56) References Cited

U.S. PATENT DOCUMENTS 3,719,268 A * 3/1973 Koehnen ..................... 198/632
3,974,908 A * 8/1976 Keichinger ................. 198/314
4,058,198 A * 11/1977 O'Neill et al. .............. 198/313
4,714,149 A * 12/1987 Tiede ......................... 198/312

* cited by examiner

Primary Examiner—James R. Bidwell
(74) Attorney, Agent, or Firm—Frost Brown Todd LLC

(57) ABSTRACT

A conveyor transport apparatus comprises a main portable conveyor and a secondary conveyor releasably attached to the main conveyor frame. An actuator is operable to move the secondary conveyor from a ground position where the secondary conveyor is supported on the ground, to a transport position where the secondary conveyor is raised above the ground. The apparatus may be configured so that the secondary conveyor is supported on the ground and attached to the main conveyor when the main conveyor is in a raised position and the secondary conveyor is raised above the ground when the main conveyor is in a lowered position. The main conveyor can be attached to a towing vehicle for transport of the apparatus.

19 Claims, 6 Drawing Sheets

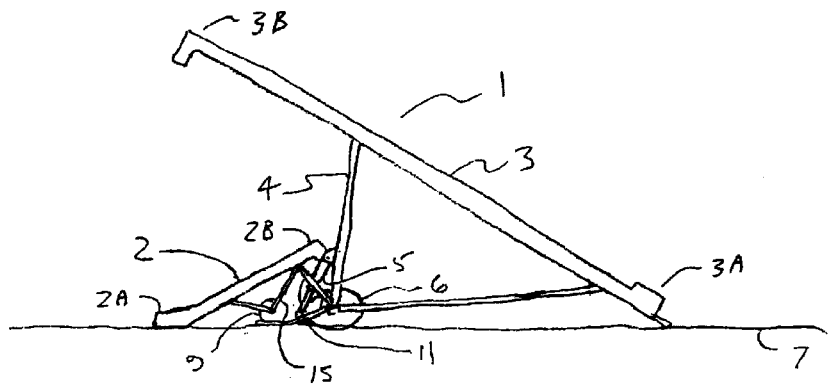
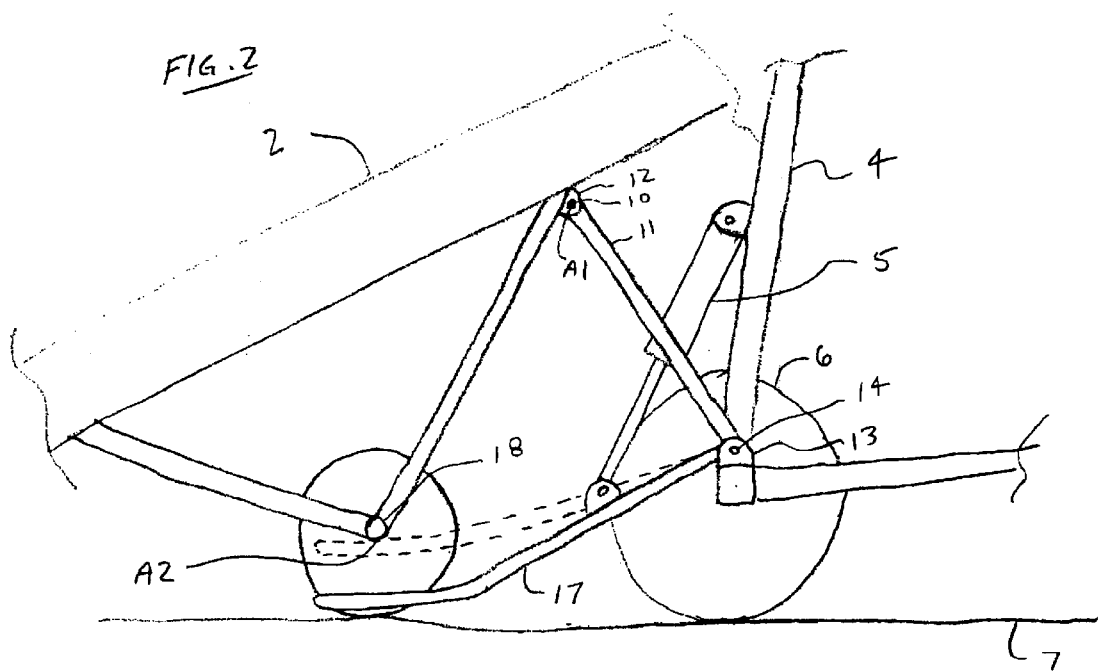
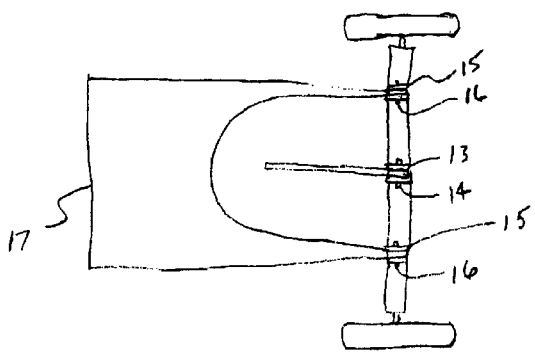

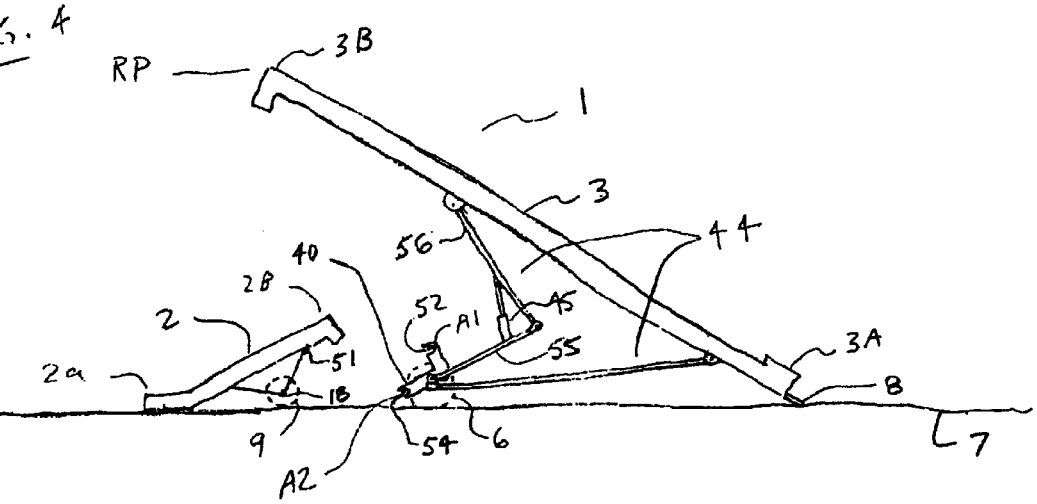
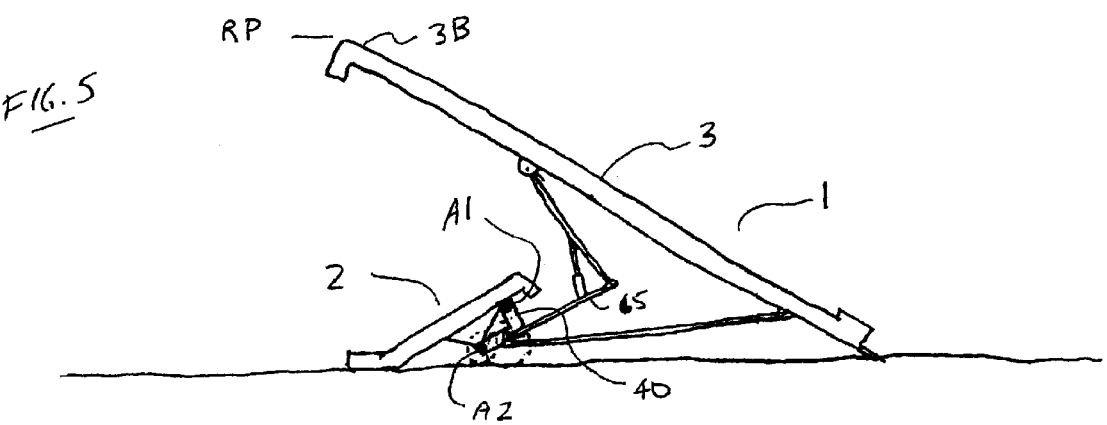
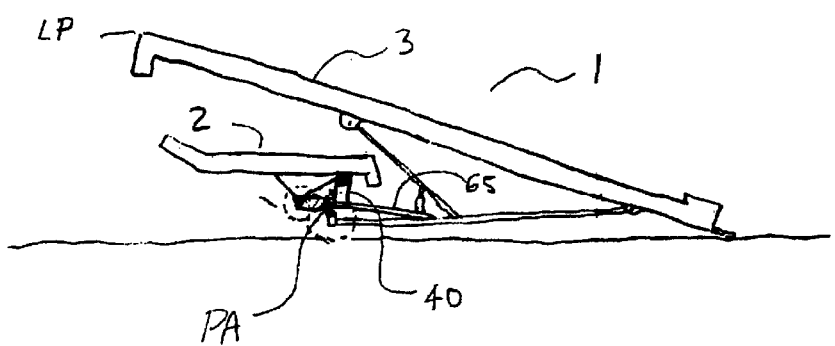

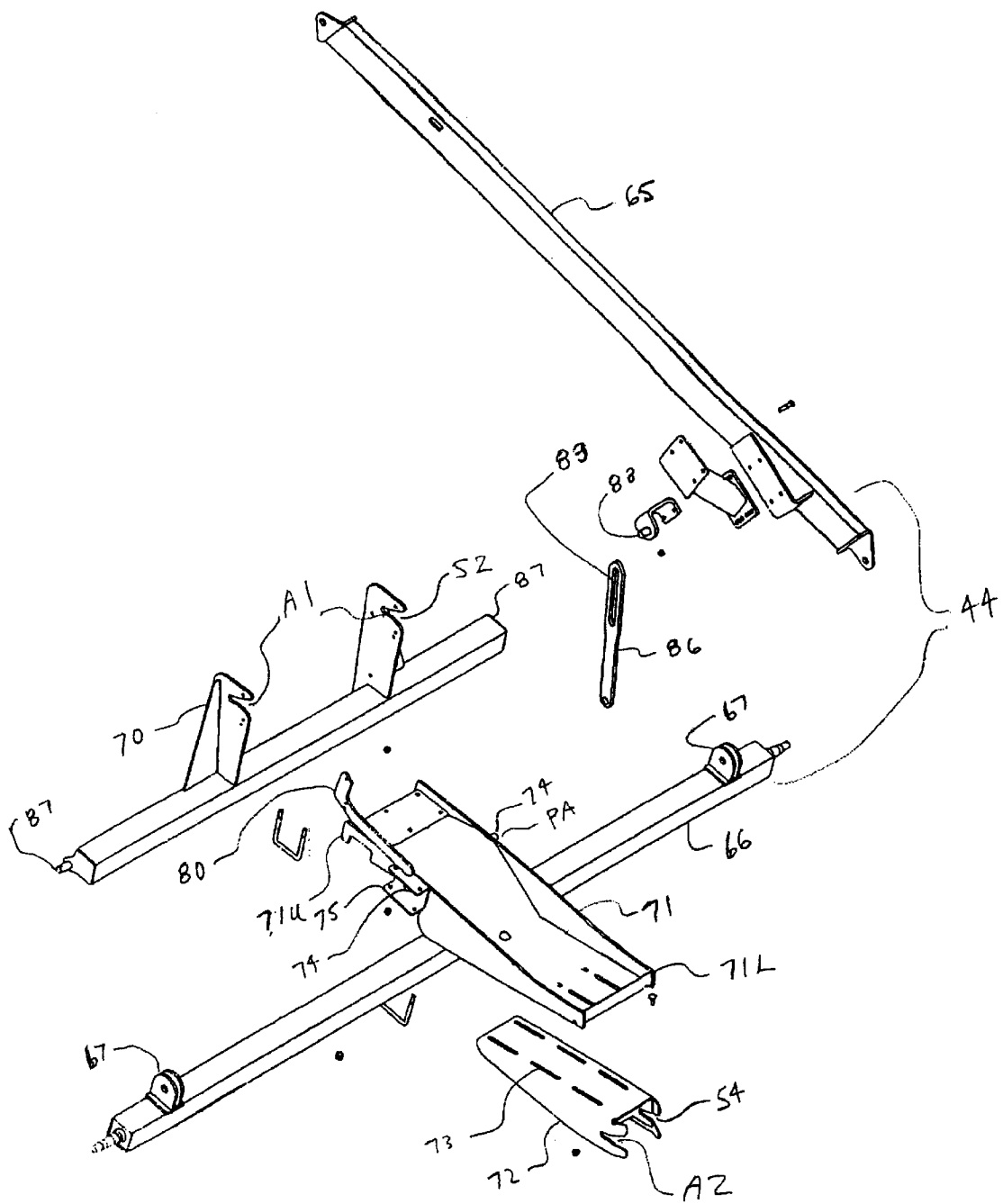

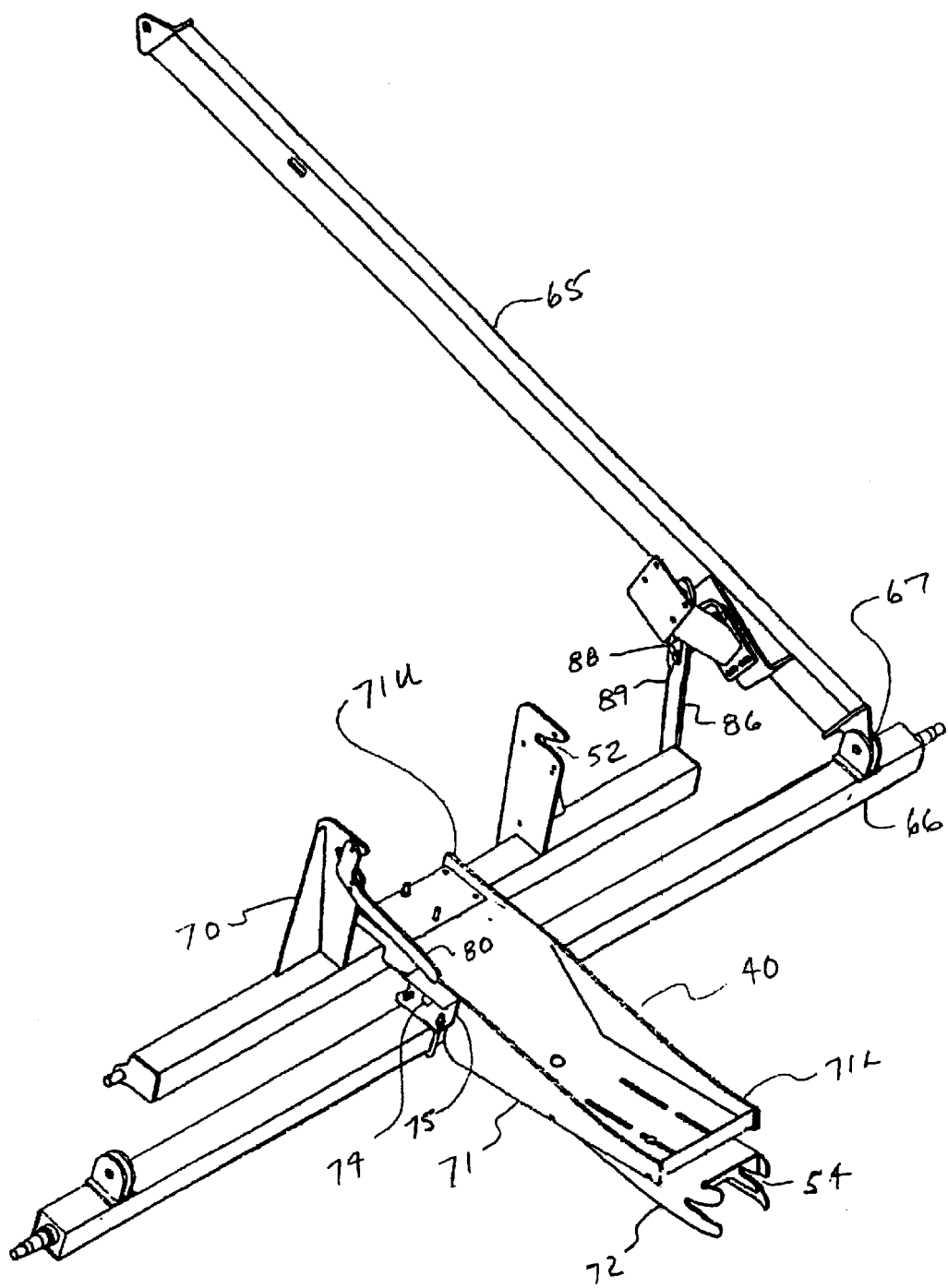

CONVEYOR TRANSPORT

This invention is in the field of portable conveyors and in particular the transport of such conveyors from one location to another.

BACKGROUND OF THE INVENTION

Portable conveyors generally comprise a conveyor body mounted on a frame. Most commonly the frame is adjustable, allowing the upper discharge end of the conveyor body to be raised or lowered to a desired location while the lower input end is at rest on the ground or the like. An actuator such as an extensible cylinder or winch is commonly employed to manipulate the adjustable frame and raise the conveyor body, and may be manually operated or powered by hydraulics, electricity, or the like.

The adjustable frame is commonly a scissor type where the actuator changes the angle between pivotally connected upper and lower elevating members to elevate the conveyor body. Also common is an adjustable frame where a sliding frame member adjacent to the discharge end of the conveyor body is moved along the lower surface of the main conveyor body to change the angle. Although these are most common, other adjustable frames can be used as well.

The frame is mounted on wheels, and is commonly towed by a hitch attached at the intake end of the main conveyor body. When towed the discharge end of the conveyor body is lowered to improve stability. Both belt and auger portable conveyors are common.

Such portable conveyors are commonly used in pairs for first conveying material from a truck or the like to an accessible location where a second larger conveyor can be placed to convey the material to the desired delivery location. For example, a small transfer conveyor is used to receive grain from a hopper trailer, which is inaccessible to most conveyors. The transfer conveyor carries the grain to a main conveyor which carries it into a bin or the like. Other examples could include a situation where packages are carried on a belt conveyor from a truck or the like.

Such pairs of conveyors have the advantage of being more versatile than a single conveyor unit that could be configured to do the same job. Each separate conveyor of the pair can be used individually for different purposes, or with a different conveyor as a pair for the same or similar purposes.

A disadvantage however appears where it is desired to move the pair to a remote location. Two towing vehicles are required, or where the configuration allows, one may be towed behind the other. A small transfer conveyor may be supported for movement along the ground on skids or on small wheels not suitable for towing, requiring loading on a truck or the like for transport.

SUMMARY OF THE INVENTION

It is the object of the present invention to provide an apparatus for transporting two portable conveyors as a single unit towed by a single towing vehicle.

It is a further object of the invention to provide such an apparatus wherein a secondary conveyor can be maneuvered adjacent to a main conveyor when the main conveyor is in a raised position and releasably attached thereto such that when the main conveyor is moved to a lowered position, the secondary conveyor is raised above the ground.

It is a further object of the invention to provide a method of transporting a main and secondary conveyor together as a unit.

The invention provides, in one aspect, a main conveyor comprising a main conveyor body including a lower main input end and an upper main discharge end; a frame supporting the main conveyor body; wheels supporting the frame for movement of the main conveyor along the ground; and a hitch at the main input end for attachment of a towing vehicle; a secondary conveyor comprising a lower secondary input end and an upper secondary discharge end, and a support for movement along the ground, the secondary conveyor releasably attached to the frame; an actuator operable to move the secondary conveyor from a ground position where the secondary conveyor is supported on the ground, to a transport position where the secondary conveyor is raised above the ground.

The invention provides, in a second aspect, a conveyor transport apparatus comprising a main conveyor comprising a main conveyor body including a lower main input end and an upper main discharge end; an adjustable frame supporting the main conveyor body such that the vertical position of the main discharge end can be adjusted from a raised position to a lowered position; an actuator attached to the adjustable frame and operable to move the main discharge end from the raised position to the lowered position; wheels supporting the frame for movement of the main conveyor along the ground; and a hitch at the main input end for attachment of a towing vehicle; and a secondary conveyor comprising a lower secondary input end and an upper secondary discharge end, and a support for movement along the ground, the secondary conveyor releasably attached to the adjustable frame such that the secondary conveyor is supported on the ground when the main conveyor is in the raised position and the secondary conveyor is raised above the ground when the main conveyor is in the lowered position.

The invention provides, in a third aspect, a method of transporting a main conveyor and secondary conveyor wherein the main conveyor comprises a main conveyor body including an main input end and a main discharge end; a frame supporting the main conveyor body; wheels supporting the frame for movement of the main conveyor along the ground; and a hitch at the main input end for attachment of a towing vehicle; and wherein the secondary conveyor comprises a support for movement thereof along the ground; the method comprising the following steps: moving the secondary conveyor into a position between the main discharge end and the wheels; releasably attaching the secondary conveyor to the adjustable frame; activating an actuator attached to the main conveyor to move the secondary conveyor upwards, with respect to the main conveyor, to a transport position where the secondary conveyor is above the ground; and attaching a towing vehicle to the hitch.

The apparatus and method allow for transporting two portable conveyors as a single unit towed by a single towing vehicle.

The apparatus and method may conveniently utilize the existing raising and lowering mechanism of a main conveyor to raise a secondary conveyor from the ground so that the two can be towed as a unit.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic side view of an apparatus of the invention;

FIG. 2 is a side view detailing the lift mechanism;

FIG. 3 is a top view of the lift arm and its attachment to the main conveyor;

FIG. 4 is a schematic side view of an alternate embodiment where the main conveyor and secondary conveyor are separated for use;

FIG. 5 is a schematic side view of the main conveyor and secondary conveyor of FIG. 4 releasably attached together;

FIG. 6 is a schematic side view of the attached main conveyor and secondary conveyor shown in FIG. 5 with the main conveyor lowered and the secondary conveyor raised for transport;

FIG. 7 is an exploded perspective detail view of the adjustable frame of the main conveyor and the transport bracket;

FIG. 8 is an assembled perspective view of the parts of FIG. 7;

DETAILED DESCRIPTION OF THE ILLUSTRATED EMBODIMENTS

Figure 9:
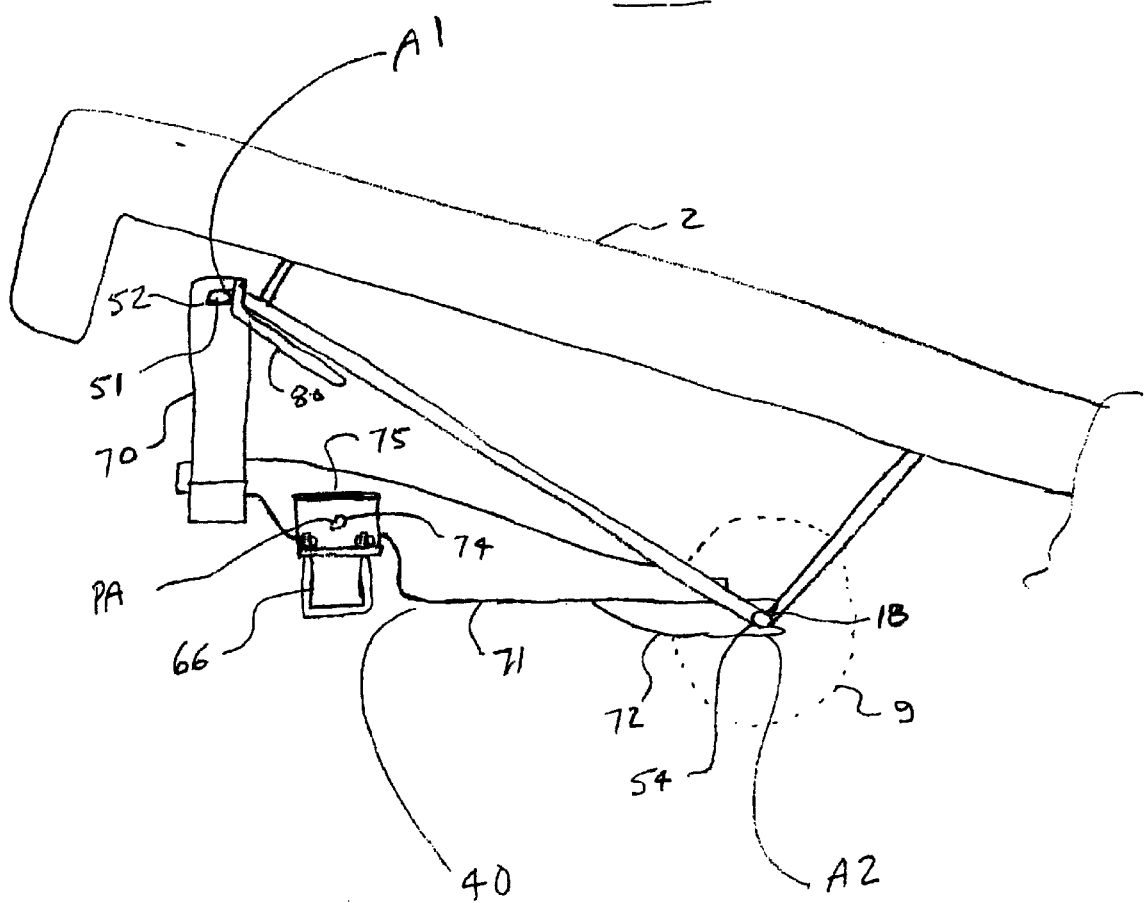
FIG. 9 is a schematic side view showing the releasable attachment of the secondary conveyor to the transport bracket, and the pivotal attachment of the transport bracket to the axle member.

FIGS. 1–3 illustrate a conveyor transport apparatus of the invention comprising a secondary convey or 2 releasably attached to a main conveyor 1. The main conveyor 1 comprises a main conveyor body 3 including a lower main input end 3A and an upper main discharge end 3B. A frame 4 supports the main conveyor body 3 and main wheels 6 support the frame 4 for movement of the main conveyor 1 along the ground 7. A hitch 8 is attached at the main input end 3A for attachment of a towing vehicle (not illustrated). The near main wheel 6 is removed for clarity.

The secondary conveyor 2 comprises a lower secondary input end 2A and an upper secondary discharge end 2B and is supported for movement along the ground 7 on secondary wheels 9. The near secondary wheel 9 is removed for clarity. The secondary conveyor 2 could also be supported for movement along the ground 7 on skids or the like as is known in the art.

The secondary conveyor 2 is releasably attached to the main conveyor 1 at a first attachment point A1, being provided by pin 11 through pivot arm 11 and pin bracket 12. The opposite end of the pivot arm is pivotally attached to the frame 4 at pivot bracket 13 by pivot pin 14 such that the first attachment point A1 is movable so as to pivot about a substantially horizontal first pivot axis provided by the pivot pin 14.

Lift arm 17 is pivotally attached to the frame 4 at lift brackets 15 by lift pins 16 such that the second attachment point A2 is movable so as to pivot about a substantially horizontal second pivot axis provided by the lift pins 16. In the illustrated embodiment the first and second pivot axes at pins 14 and 16 coincide for convenience, however other configurations could be used where the axes were not coincidental. Where the axes did not coincide, the movement of one end of the secondary conveyor 2 would be different relative to the frame 4 than in the illustrated embodiment, however in some situations this may be desirable.

An actuator 5 is attached to the frame 4 and the lift arm 17. As illustrated, the actuator 5 is an extensible cylinder, however it could as well be a winch or the like.

When the secondary conveyor 2 is attached to the first attachment point A1, lifting the lift arm 17 with the actuator 5 moves the first and second attachment points A1, A2 about the respective first and second pivot axes, pins 14 and 16. When the lift arm 17 rises, it comes to bear against the axle 18 of the secondary conveyor 2, as illustrated in FIG. 2, at second attachment point A2. As the lift arm 17 moves up, the secondary conveyor 2 is moved from a ground position where it is supported on the ground 7, to a transport position where it is raised above the ground 7.

The lift arm 17 is wide enough to support a substantial length of the axle 18, providing lateral stability to the secondary conveyor 2. The axle 18 can be secured to the lift arm 17 to increase the stability of the apparatus for rough travel.

FIGS. 4–6 illustrate an alternate conveyor transport apparatus of the invention conveniently utilizing the existing raising and lowering mechanism of a main conveyor 1 to raise a secondary conveyor 2 from the ground 7 so that the two can be towed as a unit. The main conveyor 1 includes a main conveyor body 3 including an input end 3A and a main discharge end 3B. An adjustable frame 44 supports the main conveyor body 3 such that the vertical position of the main discharge end 3B can be adjusted from a raised position RP to a lowered position LP. An actuator is illustrated as extensible cylinder 45 and is attached to the frame 44 and operates to move the main discharge end 3B from the raised position RP to the lowered position LP. Main wheels 6 support the frame 44 for movement of the main conveyor 1 along the ground 7. A hitch 8 is attached at the input end 3A for attachment of a towing vehicle.

The secondary conveyor 2 as illustrated is supported for movement along the ground 7 on secondary wheels 9. The secondary conveyor 2 could also be supported for movement along the ground 7 on skids or the like as is known in the art.

The secondary conveyor 2 is releasably attached to the frame 44, between the main wheels 6 and the main discharge end 3B of the main conveyor 1, at a first attachment point A1 and at a second attachment point A2. When the actuator 45 is operated to lower the main discharge end 3B, the first and second attachment points A1, A2 pivot about a substantially horizontal pivot axis PA to raise the secondary conveyor 2 off the ground 7.

The secondary conveyor 2 is supported on the ground 7 when the main conveyor 1 is in the raised position RP as illustrated in FIG. 2. The secondary conveyor 2 is raised above the ground 7 when the main conveyor 1 is in the lowered position LP as illustrated in FIG. 3. The apparatus is then ready to be transported to a desired location where the secondary conveyor 2 can be lowered to the ground 7 by raising the main conveyor 1 to the raised position RP, and released for use.

Transport bracket 40 is releasably attached to the secondary conveyor 2 at the first attachment point Al and attached to the frame 44 such that as the main discharge end 3B moves from the raised position RP to the lowered position LP, the transport bracket 40 bears against the secondary conveyor 2 at the second attachment point A2 and the transport bracket 40 exerts a force on the secondary conveyor 2 at the first attachment point Al causing it to move to the transport position raised above the ground 7. The illustrated transport bracket 40 engages a horizontal shaft 51, attached to an upper portion of the secondary conveyor 2, at upper notch 52. The horizontal shaft 51 is locked into engagement with the transport bracket 40. The axle 18 of the secondary conveyor 2 engages lower notch 54 in the transport bracket 40 and can be locked if desired however the configuration of the apparatus is such that the secondary conveyor 2 will be maintained in position by locking the horizontal shaft 51 into the upper notch 52.

In FIGS. 4–6 it can be seen that the transport bracket 40 could be fixed to the lower elevating member 55 to move the transport bracket 40 as required to raise the secondary conveyor 2 from the ground 7. As the cylinder 45 extends and retracts to raise and lower the main discharge end 3B, the lower elevating member 55 and transport bracket 40 would move together. The cylinder 45 would be adjusted to the position of FIG. 1 to properly locate the transport bracket 40 for engagement with the secondary conveyor 2.

FIGS. 7 and 8 illustrate a transport bracket 40 mounted to frame 44 to facilitate easier alignment and engagement of the secondary conveyor 2 and transport bracket 40. The frame 44 comprises a pair of lower elevating members 65 pivotally attached to an axle member 66 at hinges 67. Only one of the pair is illustrated.

The transport bracket 40 includes upper and lower bracket engagement points releasably engageable in upper and lower conveyor engagement devices on the secondary conveyor 2 at the first and second attachment points A1, A2. The transport bracket 40 comprises an upper notch member 70, to provide the upper bracket engagement points, attached by U-bolts to the upper end 71U of the bracket plate 71 and, to provide the lower bracket engagement points, a lower notch member 72 attached by bolts through slots 73 to the opposite lower end 71L of the bracket plate 71. The slots 73 allow for proper adjustment to accommodate the secondary conveyor 2 in the upper and lower notches 52, 54. Similar slotted attachment could be provided in the upper notch member 70 for further adjustment.

As illustrated in FIG. 9, the transport bracket 40 thus defines a pair of horizontally separated upper notches 52 engaging the horizontal shaft 51 attached to the secondary conveyor 2, and a pair of horizontally separated lower notches 54 engaging the axle 18 of the secondary conveyor 2. Lock arm 80 is rotated up to allow the horizontal shaft 51 to engage the upper notches 52, and then rotated down and pinned to lock the conveyors 1, 2 together. Rather than lower notches 54 engaging the axle 18, the wheels 9 of the secondary conveyor 2 could be rolled onto brackets or ramps fixed to the transport bracket 40, however the tires give and do not secure the secondary conveyor 2 as rigidly as does the attachment directly to the axle 18.

On the adjustable frame 44, the axle member 66 remains substantially stationary as the lower elevating member 65 pivots up and down on the hinge 67 to raise and lower the main discharge end 3B. The transport bracket 40 is pivotally attached to the axle member 66 by pins 74 on each side of the bracket plate 71 extending through pivot plates 75 attached to the axle member 66 by u-bolts.

A link 86 is pivotally connected at its lower end to the transport bracket 40 at bracket pin 87 and at its upper end by link pin 88, which is fixed to the lower elevating member 65, through slot 89 in the link 86. The transport bracket 40 thus remains substantially stationary as the lower elevating member 65 pivots with respect to the axle member 66 when the main discharge end 3B moves down from the raised position RP towards the lowered position LP. As the main discharge end 3B approaches the lowered position LP, the link pin 88 reaches the lower end of the slot 89 and pushes against the link 86 and the upper end 71U of the bracket plate 71 to pivot the bracket plate 71 about the pins 74, moving the upper end 71U down and the lower end 71L up and thereby raising the secondary conveyor 2.

The person skilled in the art will recognize that there are innumerable mechanisms which can be used to provide the required pivoting movement of the transport bracket 40 relative to the ground so that the secondary conveyor 2 can be moved along the ground and positioned adjacent to the main conveyor 1 in the raised position RP and attached thereto, and so that when the main conveyor 1 is moved to the lowered position LP, the secondary conveyor 2 will be raised off the ground.

Figure 10:
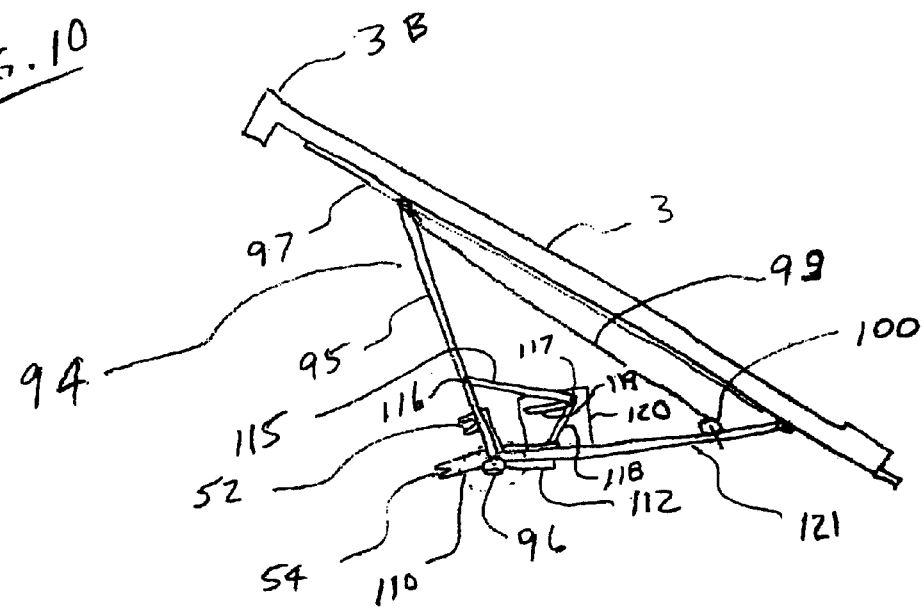
FIG. 10 is a schematic side view of one alternate embodiment of the invention.

While FIGS. 4–6 illustrate a scissor type adjustable frame, FIG. 10 illustrates an alternate embodiment used on an adjustable frame 94 including an upper elevating member 95 pivotally attached at a lower end thereof to the axle member 96. The upper end thereof is engaged in a track 97 along the underside of the conveyor body 3 and is attached via cable 99 to winch 100. As the cable 99 is wound in and out the upper elevating member 95 moves back and forth to raise and lower the conveyor body 3.

Transport bracket 110 includes a lever portion 112 fixed in relation to upper and lower notches 52, 54, and is pivotally attached to the axle member 96.

Link 115 is pivotally attached at first pivot point 116 to the upper elevating member 95 at one end, and pivotally attached at second pivot point 117 to downlink 118 at its second end. The opposite end of downlink 118 is pivotally attached to the lever portion 112 of the transport bracket 110. The second pivot point 117 is restricted to movement along slot 119 in plate 120, which is attached to lower brace 121. Thus as the upper elevating member 95 moves toward the discharge end 3B of the conveyor body 3, the conveyor body 3 moves down. The link and downlink 115, 118 act together to move the lever portion 112 down and pivot the notches 52, 54 up and raise the attached secondary conveyor 2.

Figure 11:
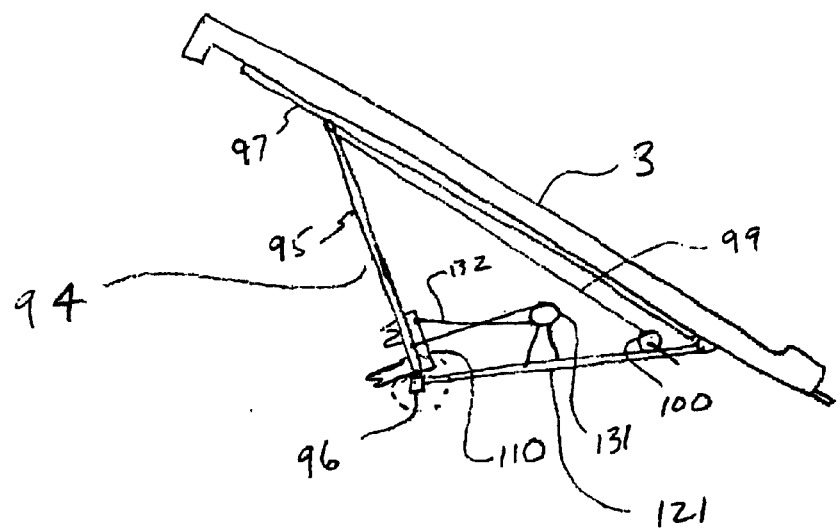
FIG. 11 is a schematic side view of a second alternate embodiment of the invention.

Alternately as illustrated in FIG. 11, the main conveyor 1 of FIG. 10 could include a chain 132 attached at one end to the upper elevating member 95 and at the opposite end to the upper notch portion of the transport bracket 110. The chain 132 passes around a sprocket or pulley 131 which is fixed to the lower brace 121. Adjusting the position of the ends of the chain 132 will give the required relative movement of the transport bracket 110 with respect to the adjustable frame 94 to raise the secondary conveyor 2 when attached.

Other systems incorporating gears, pulleys, linkages or the like could be similarly utilized on either of the adjustable frames illustrated or in other frames.

Operating the embodiments illustrated in FIGS. 4–11 requires raising the main conveyor 1 to the raised position RP; moving the secondary conveyor 2 into a position between the main discharge end 3B and the main wheels 6 where the upper and lower notches 52, 54 engage the horizontal shaft 51 and the axle 18; rotating and pinning the lock arm 80; lowering the main discharge end 3B to the lowered position LP and thereby raising the secondary conveyor 2 above the ground; and attaching a towing vehicle (not illustrated) to the hitch 8.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A conveyor transport apparatus comprising:

a main conveyor comprising a main conveyor body including a lower main input end and an upper main discharge end; a frame supporting the main conveyor body; wheels supporting the frame for movement of the main conveyor along the ground; and a hitch at the main input end for attachment of a towing vehicle;

a secondary conveyor comprising a lower secondary input end and an upper secondary discharge end, and a support for movement along the ground, the secondary conveyor releasably attached to the main conveyor at a first attachment point and at least bearing against the main conveyor at a second attachment point;

wherein the first attachment point is movable so as to pivot about a substantially horizontal first pivot axis and wherein the second attachment point is movable so as to pivot about a substantially horizontal second pivot axis;

an actuator operable to move the first and second attachment points about the respective first and second pivot axes and thereby move the secondary conveyor from a ground position where the secondary conveyor is supported on the ground, to a transport position where the secondary conveyor is raised above the ground.

2. The apparatus of claim 1 wherein the first and second pivot axes coincide.

3. The apparatus of claim 1 wherein the secondary conveyor is releasably attached to the main conveyor at the second attachment point.

4. The apparatus of claim 1 wherein the actuator is an extensible cylinder.

5. The apparatus of claim 1 wherein the actuator is a winch.

6. The apparatus of claim 1 wherein the frame is an adjustable frame, adjustable such that a vertical position of the main discharge end can be adjusted from a raised position to a lowered position and wherein the actuator is attached to the adjustable frame and operable to move the main discharge end from a raised position when the secondary conveyor is in the ground position, to a lowered position when the secondary conveyor is in the transport position.

7. A conveyor transport apparatus comprising:

a main conveyor comprising a main conveyor body including a lower main input end and an upper main discharge end; an adjustable frame supporting the main conveyor body such that the vertical position of the main discharge end can be adjusted from a raised position to a lowered position; an actuator attached to the adjustable frame and operable to move the main discharge end from the raised position to the lowered position; wheels supporting the frame for movement of the main conveyor along the ground; and a hitch at the main input end for attachment of a towing vehicle;

a secondary conveyor comprising a lower secondary input end and an upper secondary discharge end, and a support for movement along the ground;

wherein the secondary conveyor is releasably attached to the adjustable frame at a first attachment point, such that the secondary conveyor is supported on the ground when the main conveyor is in the raised position and the secondary conveyor is raised above the ground when the main conveyor is in the lowered position;

wherein the secondary conveyor at least bears against the adjustable frame at a second attachment point; and wherein the first attachment point is movable so as to pivot about a substantially horizontal first pivot axis and wherein the second attachment point is movable so as to pivot about a substantially horizontal second pivot axis.

8. The apparatus of claim 7 wherein the first and second pivot axes coincide.

9. The apparatus of claim 7 wherein the secondary conveyor is releasably attached to the main conveyor at the second attachment point.

10. The apparatus of claim 7 wherein the secondary conveyor is attached to the adjustable frame so as to be located between the wheels and the main discharge end.

11. The apparatus of claim 7 wherein the secondary input end is located nearer the main discharge end than the secondary discharge end and the secondary conveyor is generally aligned with the main conveyor body.

12. The apparatus of claim 7 further comprising at least one transport bracket attached to the adjustable frame and releasably attached to the secondary conveyor at the first attachment point such that as the main discharge end moves from the raised position to the lowered position, the transport bracket bears against the secondary conveyor at the second attachment point and the transport bracket exerts a force on the secondary conveyor at the first attachment point causing the secondary conveyor to move to a transport position raised above the ground.

13. The apparatus of claim 12 wherein the transport bracket includes an upper bracket engagement device releasably engaging a corresponding upper conveyor engagement device on the secondary conveyor at the first attachment point, and the transport bracket includes a lower bracket engagement device releasably engaging a corresponding lower conveyor engagement device on the secondary conveyor at the second attachment point.

14. The apparatus of claim 13 wherein the transport bracket defines a pair of horizontally separated upper notches engaging a substantially horizontal shaft attached to the secondary conveyor, and further defines at least one lower notch engaging an axle of the secondary conveyor.

15. The apparatus of claim 13 wherein the transport bracket defines a pair of horizontally separated lower notches engaging an axle of the secondary conveyor, and further defines at least one upper notch engaging the secondary conveyor.

16. The apparatus of claim 12 wherein the adjustable frame includes a first frame member, and a second frame member which moves with respect to the first frame member as the actuator moves the main discharge end of the main conveyor body up or down; and wherein the transport bracket is pivotally attached to the first frame member and the transport bracket is connected to the second frame member by a link.

17. The apparatus of claim 16 wherein the link comprises a slot, such that the transport bracket remains substantially stationary as the second frame member moves with respect to the first frame member when the main discharge end of the main conveyor body moves down from the raised position towards the lowered position; and such that as the main discharge end approaches the lowered position, the link causes the transport bracket to move and raise the secondary conveyor.

18. A method of transporting a main conveyor and secondary conveyor wherein the main conveyor comprises a main conveyor body including an main input end and a main discharge end; a frame supporting the main conveyor body; wheels supporting the frame for movement of the main conveyor along the ground; and a hitch at the main input end for attachment of a towing vehicle; and wherein the secondary conveyor comprises a support for movement thereof along the ground; the method comprising the following steps:

moving the secondary conveyor into a position between the main discharge end and the wheels;

releasably attaching the secondary conveyor to the adjustable frame at a first attachment point;

activating an actuator attached to the main conveyor to pivot the first attachment point and to pivot a second attachment point causing the second attachment point to bear against the secondary conveyor, thereby moving the secondary conveyor upwards, with respect to the main conveyor, to a transport position where the secondary conveyor is above the ground; and attaching a towing vehicle to the hitch.

19. The method of claim 18 wherein the frame is an adjustable frame supporting the main conveyor body such that a vertical position of the main discharge end can be adjusted from a raised position to a lowered position and wherein the actuator is attached to the adjustable frame and is operable to move the main discharge end from the raised position to the lowered position, the method comprising the following steps:

raising the main conveyor to the raised position;

moving the secondary conveyor into a position between the main discharge end and the wheels;

releasably attaching the secondary conveyor to the adjustable frame at the first attachment point;

activating the actuator to lower the main discharge end to the lowered position, thereby causing the first and second pivot points to pivot and thereby raise the secondary conveyor to the transport position; and attaching a towing vehicle to the hitch.

\* \* \* \* \*